May 2, 1950     I. H. G. SAINT     2,506,111

VALVE

Filed Feb. 16, 1945

INVENTOR.
IVOR HORACE GORDON SAINT
BY Cecil J Arens
ATTORNEY

Patented May 2, 1950

2,506,111

UNITED STATES PATENT OFFICE 2,506,111

VALVE

Ivor Horace Gordon Saint, Leamington Spa, England, assignor to Automotive Products Company Limited, Leamington Spa, England Application February 16, 1945, Serial No. 578,149
In Great Britain January 3, 1944

2 Claims. (Cl. 251—75)

This invention relates to valves for controlling the flow of fluids.

It is an object of the invention to provide an improved form and construction of valve of the piston type which is capable of withstanding relatively heavy fluid pressure.

A further object of the invention is to provide an improved form and construction of packing device which is efficient in operation and which moreover is protected from damage caused by passing over ports, controlling edges and the like where the packing is required to make such movements.

According to the invention a sealing device to prevent leakage of fluid between a pair of members comprises an annular groove formed in one of the members, an endless packing ring which is composed of soft resilient material as soft rubber so as to enable its effective diameter to change readily, and which is disposed within said groove, the axial thickness of the packing ring being greater than the width of the groove so that said ring always presses against both side walls of the groove, and a conduit connecting with the pressure side of the packing, the space between the bottom of the groove and the adjacent surface of the packing ring.

Moreover, in a fluid pressure valve having a piston member slidable within a bore in a body member, according to the invention a sealing device between the piston member and the body member comprises an annular groove formed in one of the members, an endless packing ring which is composed of soft resilient material such as soft rubber so as to enable its effective diameter to change readily, and which is disposed within said groove, the axial thickness of the packing ring being greater than the width of the groove so that said ring always presses against both side walls of the groove, and a conduit connecting with the pressure side of the packing, the space between the bottom of the groove and the adjacent surface of the packing ring. Preferably the packing ring is arranged to slide along a surface on the other member and the range of movement of the packing ring relative to said surface takes the ring beyond the edge of said surface into register with a recess which is in free communication with the said conduit conducting fluid pressure to the space at the bottom of the packing groove, thus causing the pressures acting internally and externally on the ring to be balanced and so enabling the ring to resume its relaxed position in which it lies wholly within the groove. The packing may be arranged so that, when the packing device is in action, the mouth of the groove is in relatively free communication with the lower pressure side of the valve, and is relatively isolated from the pressure side of the valve; thus the clearance between the relatively sliding surfaces of the members may be greater at the lower pressure side of the groove for the packing ring, than it is at the higher side thereof. Alternatively or in addition the length of the sliding surface of the one member at the higher pressure side of the groove for the packing ring may be longer axially than the corresponding surface at the lower pressure side of the said groove.

The packing ring is usually disposed within a groove formed in the piston member and is arranged to be increased in diameter by pressure fluid in the bottom of the groove when the outer surface of the packing ring is wholly in engagement with the bore in the body. Thus the valve may comprise a body having a bore formed with a circumferential enlargement intermediate its ends, a pair of ports spaced axially from said enlargement at opposite sides thereof, and a pressure fluid connection to the enlargement, a piston valve member slidable in the bore, which piston valve member is formed with a pair of end circumferential lands slidable in the bore, and between said lands a piston portion having a greater axial length than the enlargement, said piston portion being formed with a pair of circumferential grooves containing the sealing rings, each of which latter is adapted to lie wholly within its groove when said groove is in register with the enlargement of the bore, but to be forced outwards by the fluid pressure when the packing ring is in register with the corresponding portion of the bore.

The invention is illustrated in the accompanying drawings, in which.

Figure 1:
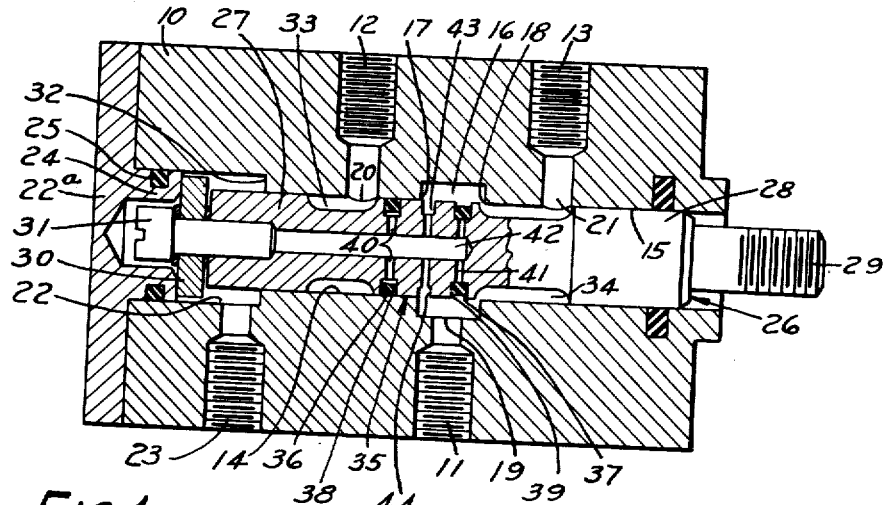
Figure 1 is a sectional elevation showing the improved packing device applied to a two-way valve of the piston type.

The valve shown in Figure 1 comprises a body member 10 having a fluid pressure inlet connection 11 and two outlet connections 12 and 13. The body member 10 is formed with a longitudinal bore which is divided into two portions 14 and 15 by a circumferential enlargement 16, thus producing a pair of controlling edges 17 and 18 at the adjacent ends of the bore sections 14 and 15, respectively. The enlargement 16 is permanently connected with the pressure fluid inlet connection 11 by a passage 19, while the bore sections 14 and 15 have ports 20 and 21 constituted by the ends of passages leading to the outlet connections 12 and 13.

At its left-hand end the bore 14, 15 is enlarged, as indicated at 22, and is in communication with a drain or exhaust connection 23, said bore being closed by an end cover plate 22a having a plug 24 integral therewith which fits into the enlarged portion 22 and which is provided with a circumferential packing 25 to prevent leakage of fluid.

A piston valve member, indicated generally at 26, is disposed within the bore 14, 15 and has a pair of end enlarged portions or lands 27 and 28 which are a snug sliding fit within the respective bore sections 14 and 15. The piston valve member 26 is actuated by a screw-threaded external spigot 29, its stroke being limited by a washer 30 which is fixed to its left-hand end by means of a screw 31 and which operates within the enlarged portion 22 of the bore so as to engage with the spigot 24 when the valve member 26 is moved to the left; on the other hand movement of the valve member 26 to the right causes the washer 30 to engage a shoulder 32 when the end of the stroke is reached.

Adjacent the lands 27 and 28 the piston member 26 is reduced in diameter to form waist portions surrounded by wide circumferential grooves 33 and 34, that part of the piston valve member between said grooves constituting a piston portion 35. The piston valve member 26 is shown in its left-hand position in Figure 1 and it will be seen that the piston portion 35 blocks the bore section 14 adjacent the controlling edge 17, thus isolating the outlet connection 12 from the inlet 11, whereas the piston portion 35 is clear of the controlling edge 18 so that fluid can flow freely from the inlet 11 into the circumferential enlargement 16 and thence past the controlling edge 18 to the groove 34 and the outlet connection 13. Conversely, when the piston valve member 26 is in its right-hand position the outlet 13 is isolated, whereas pressure fluid from the inlet 11 can flow past the controlling edge 17 to the outlet connection 12. When the piston valve member 26 is in its central or off position the piston portion 35 blocks both of the bore sections 14 and 15 and consequently isolates both of the outlet connections 12 and 13 from the inlet 11.

The invention is concerned with the packing means used for obtaining an efficient fluid seal between the piston portion 35 and the bore sections 14 and 15, taking into account the fact that the piston portion 35 has to move into and out of engagement with the controlling edges 17 and 18; ordinary packing rings, such as those composed of soft rubber, are found to be unsatisfactory as the relatively sharp controlling edges 17 and 18 cause rapid wear and quickly render the packing rings ineffective.

The piston portion 35 is formed adjacent its extremities with a pair of circumferential grooves 36 and 37 containing packing rings 38 and 39 composed of soft rubber or like elastic material. Sets of radial passages 40 and 41 extend from the bottoms of the grooves 36 and 37 and communicate with a passage 42 drilled axially into the piston valve member 26; the left-hand end of the passage 42 is sealed in a fluid-tight manner by the screw 31. The passage 42 is in permanent communication with the pressure fluid in the inlet 11 owing to the provision of a number of radial passages 43, the outer ends of which are open to the enlargement 16 irrespective of the position occupied by the piston valve member 26, said passages 43 conveniently terminating in a circumferential groove 44 formed half-way along the length of the piston portion 35.

Figure 2:
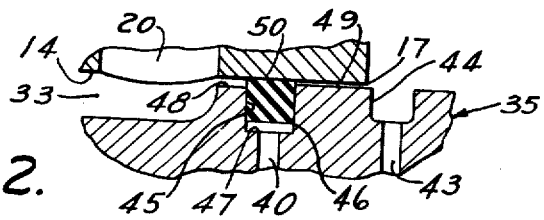
Figures 2 and 3 are fragmentary sectional views drawn to an enlarged scale to show the action of the packing in operation.
Figure 3:
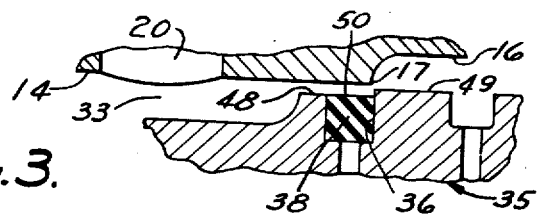

The design of the piston portion 35 and the manner in which the packing rings 38 and 39 are fitted are shown more clearly in Figures 2 and 3 which depict only, to an enlarged scale, the left-hand part of the piston portion 35 with the ring 38, since the other right-hand half is identical. The groove 36 within which the packing ring 38 is disposed is of substantially rectangular cross-section with side walls indicated at 45 and 46 and a bottom 47. The packing ring 38 is endless and is also of rectangular cross-section, said ring in its natural state having an axial thickness such that it fits snugly between the walls 45 and 46 and is somewhat compressed thereby so as to prevent leakage of pressure fluid in a radial direction along said walls 45 and 46. The packing ring 38 is, however, of such a diameter that it tends to assume a position in which it lies wholly within the groove 36, as will be seen in Figure 3. It may here be noted that the piston portion 35 is slightly smaller in diameter than the bore 14, 15 but it is, of course, held centrally in said bore owing to the provision of the lands 27 and 28. In particular the outer surface 48 at each end of the piston portion 35, between the packing groove 36 (or 37) and the circumferential groove 33 (or 34), is arranged to have a substantial clearance relative to the bore section 14 (or 15), the axial length of said surface 48 being comparatively short; on the other hand the surface 49 which is at the opposite side of the packing ring 38 (or 39) and which is permanently exposed to the fluid pressure in the inlet 11 is a relatively close fit within the bore section 14 (or 15) and has a comparatively large axial length. Thus, when the piston member 26 is in the position shown in Figure 2 the pressure fluid from the inlet 11 can flow through the passages 43, 42 and 40 into the bottom of the groove 36 where it acts to expand the packing ring 38 until the outer surface 50 of said ring engages firmly with the bore section 14; owing to the small clearance along the surface 49 the inlet pressure cannot act to any substantial extent upon the outside of the packing ring 38, especially in view of the fact that relatively large clearance along the surface 48 puts said outer surface 50 into practically free communication with the port 20 where the pressure is low.

When the piston valve member 26 is moved to the right, as shown in Figure 3, these conditions continue until the leading edge of the packing ring 38 reaches, or nearly reaches, the control edge 17 at the end of the bore section 14. At this stage, of course, the inlet pressure existing within the enlargement 16 gains free access to the outside surface 50 of the packing ring 38, thus enabling the latter to contract and resume its natural size. By this means the surface 50 is caused to leave the surface of the bore 14 and during subsequent movement of the piston valve member 26 the packing ring 38 is entirely free from the contact edge 17, thus avoiding damage and abrasion by said edge. Similarly when the piston valve member 26 is returned, say to the position shown in Figure 2, the packing ring 38 remains at the bottom of its groove 36 until such time as the outer surface 50 of the packing ring is substantially cut off from the inlet pressure, i. e. until there is substantial overlap between the surface 49 of the piston portion 35 and the surface of the bore section 14. When the packing ring 38 is therefore well past the control edge 17 the inlet pressure acting at the bottom of the groove 36 is able to spread the packing ring 38, any working fluid between the surface 50 of the packing ring and the bore 14 being expelled along the surface 49.

Figure 4:
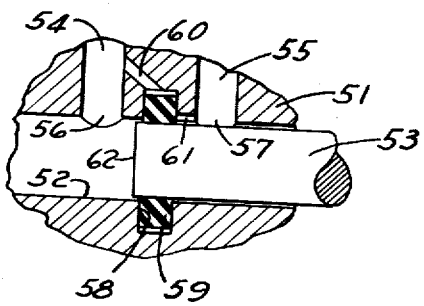
Figure 4 is a similar fragmentary view showing the invention applied to a packing ring having an internal rubbing surface.

It will be realized that, where the packing ring is provided in the body and is adapted to co-operate with a slidable piston valve member, plunger or the like, the same principle of operation can be utilized, and one such arrangement is shown diagrammatically in Figure 4. Thus, in the example shown in Figure 4, a body 51 has a bore 52 containing a sliding plunger member 53. The body 51 is formed with a pressure fluid inlet passage 54 and an outlet passage 55 terminating respectively in ports 56 and 57. A circumferential groove 58, formed in the bore between the ports, accommodates an endless compressible packing ring 59 which is a snug fit between the side walls of the groove and has a natural diameter such that it tends to assume a position in which it lies wholly within the groove 58, i. e. clear of the surface of the plunger 53. The "bottom" of the groove 58 is connected with the pressure inlet 54 by a passage 60, while the mouth part of the groove 58 is in free communication with the fluid outlet, say by a groove 61 formed in the bore 52. The front surface 62 of the plunger defines the control edge which has to pass across the inside of the packing ring 59 as the plunger moves to the right to connect the passages 54 and 55, and to the left to seal the passage 55 from the passage 54. In the "closed" position of the plunger as shown, the pressure fluid acts through the passage 60 and presses upon the outside of the packing ring 58 so as to compress the latter into firm engagement with the outside of the plunger 53. When the plunger 53 is moved to the right and the control edge 62 reaches the packing ring 59, the inlet pressure within the bore 52 is able to act upon the inside of the packing ring and therefore said packing ring is free to resume its normal size, thus reducing to substantially zero the force exerted upon the outside of the plunger 53 by the packing ring 59. In a similar manner the packing ring 59 remains substantially out of engagement with the plunger 53 during travel of the latter to the left from its "valve open" position, the internal and external fluid pressures upon the packing ring 59 remaining balanced until after the control edge 62 of the plunger 53 has passed completely across the internal surface of the packing ring 59.

It will be understood that the invention is not limited to the particular arrangements described herein and that it may be applied to valves in which a port connected to the source of pressure fluid is to be at times shut off and at other times connected to a single outlet; only one sealing ring is needed in such a valve. Moreover, the invention may be utilized in connection with packing devices for maintaining a fluid-tight connection between a pair of relatively rotating members, such, for instance, as between an angularly movable shaft and a bearing. Where the invention is applied to valves it ensures that as either of the sealing rings passes a controlling edge to enter a sealing portion of the bore said ring is fully within its groove, and cannot be damaged by contact with the controlling edge.

What I claim is:

1. In a device for controlling fluid under pressure, a body member having a bore therein, an inlet port in the body opening into one end of the bore and adapted to be connected to a high pressure source, an outlet port in the body opening into the opposite end of the bore and adapted to be connected to a low pressure source, a piston member slidable within the bore, sealing means between the body member and the piston member including an annular groove formed in one of the members, an endless packing ring disposed within said groove and composed of soft resilient material to enable its effective diameter to change readily, the axial thickness of the packing ring being greater than the width of the groove so that said ring always presses against both side walls of the groove, said packing ring being so arranged between the body member and the piston member that at a time when the piston is in a predetermined relative position in the bore one side of the packing ring is subjected to a high pressure from the inlet port and the opposite side is subjected to a low pressure from the outlet port, the diameter of the piston beginning at one side of said groove and extending axially therealong a predetermined distance is less than the diameter of the piston beginning at the other side of said groove and extending axially therealong in the opposite direction a predetermined distance so that that side of the packing ring subjected to sliding engagement will have the benefit of an unrestricted low pressure acting on the side of said packing ring adjacent said outlet port side and a restricted high pressure acting on the side of said packing ring adjacent said inlet port side, and a passage connecting the side of the packing ring subjected to high pressure from the inlet port to the bottom side of the groove to thereby subject the side or surface of the packing ring adjacent the bottom side of the groove to high pressure, whereby deformation of the packing ring between the members is obtained to provide a seal therebetween.

2. In a device for controlling fluid under pressure, an inlet port in the body opening into one end of the bore and adapted to be connected to a high pressure source, an outlet port in the body opening into the opposite end of the bore and adapted to be connected to a low pressure source, a body member having a bore therein, a piston member slidable within the bore, sealing means between the body member and the piston member including an annular groove formed in one of the members, an endless packing ring disposed within said groove and composed of soft resilient material to enable its effective diameter to change readily and disposed within said groove, the axial thickness of the packing ring being greater than the width of the groove so that said ring always presses against both side walls of the groove, said packing ring being so arranged between the body member and the piston member that at a time when the piston is in a predetermined relative position in the bore one side of the packing ring is subjected to a high pressure from the inlet port and the opposite side is subjected to a low pressure from the outlet port, and a passage connecting the side of the packing ring subjected to high pressure to the bottom of the groove to thereby subject the side or surface of the packing ring adjacent the bottom side of the groove to high pressure, whereby deformation of the packing ring between the members is obtained to provide a seal therebetween, the diameter of the piston beginning at one side of the said groove and extending axially therealong a predetermined distance is less than the diameter of the piston beginning at the other side of said groove and extending axially therealong in the opposite direction a predetermined distance so that that side of the packing ring subjected to sliding engagement will have the benefit of an unrestricted low pressure acting on the side of the packing ring adjacent said outlet port and a restricted high pressure acting on the side of said packing ring adjacent said inlet port side, and the length of the sliding surface of one of the members at the high pressure side of the groove for the packing ring being longer axially than the corresponding surface on the low pressure side of said groove.

IVOR HORACE GORDON SAINT.

REFERENCES CITED

The following references are of record in the file of this patent:

UNITED STATES PATENTS

| Number | Name | Date |
|---|---|---|
| 711,121 | Porter | Oct. 14, 1902 |
| 831,603 | Davis | Sept. 25, 1906 |
| 1,123,273 | Gregersen | Jan. 5, 1915 |
| 1,373,195 | Mead | Mar. 29, 1921 |
| 1,721,114 | Hampton | July 16, 1929 |
| 1,990,618 | Schoene | Feb. 12, 1935 |

FOREIGN PATENTS

| Number | Country | Date |
|---|---|---|
| 372,607 | Great Britain | of 1932 |
| 678,371 | France | of 1930 |